United States Patent
Miller et al.

[15] 3,662,163
[45] May 9, 1972

[54] DIGITAL SIGNAL LINEARIZER
[72] Inventors: David E. Miller, Beverly; Robert C. Heil, Peabody, both of Mass.
[73] Assignee: General Electric Company
[22] Filed: Aug. 4, 1970
[21] Appl. No.: 60,820

[52] U.S. Cl. .....................235/197, 235/150.3, 340/347 AD
[51] Int. Cl. .................................G06f 15/34, H03k 13/20
[58] Field of Search ..........235/150.1, 150.3, 150.31, 150.5, 235/150.52, 150.53, 196–197, 194; 328/13–14, 30, 48; 331/51, 53; 340/347 AD

[56] References Cited

UNITED STATES PATENTS

| | | | |
|---|---|---|---|
| 3,482,084 | 12/1969 | Trusov et al. | 235/150.3 |
| 3,529,138 | 9/1970 | Andre et al. | 235/150.5 X |
| 3,551,826 | 12/1970 | Sepe | 331/53 X |
| 3,331,035 | 7/1967 | Strickholm | 328/14 X |
| 3,431,499 | 3/1969 | Godfrey | 328/48 |
| 3,435,196 | 3/1969 | Schmid | 235/194 X |

Primary Examiner—Malcolm A. Morrison
Assistant Examiner—Jerry Smith
Attorney—I. David Blumenfeld, Robert P. Cogan, Frank L. Neuhauser, Oscar B. Waddell and Joseph B. Forman

[57] ABSTRACT

A digital signal linearizer for obtaining a linear digital output from a non-linear input. The input voltage is a non-linear representation of a quantity, such as temperature as measured by a thermocouple sensor. A voltage controlled oscillator converts the input voltage to a pulse train having a pulse rate which is a linear representation of the input voltage, but like the input voltage, is a non-linear representation of the measured quantity. The pulses are connected through a NAND gate to programmable N frequency divider for fixed repeated intervals. Hence, the number of pulses passed depends directly on the repetition rate of the oscillator output pulses. Since the voltage, and hence pulse rate v. Quantity measured characteristics of the sensor are known, the divider is programmed to provide a division factor $n$ which varies over different segment of the range of interest so that the output pulse count from the divider is linearly related to the quantity being measured.

7 Claims, 4 Drawing Figures

PATENTED MAY 9 1972  3,662,163

INVENTORS
DAVID E. MILLER
ROBERT C. HEIL

BY Joseph B. Forman
ATTORNEY 3,662,163

DIGITAL SIGNAL LINEARIZER

BACKGROUND OF THE INVENTION

This invention relates to signal converting apparatus. More specifically, it relates to an apparatus for converting a non-linearly varying electrical signal to a linearly varying digital signal.

The rapid and accurate measurement and display of quantities or variables such as temperature, pressure, density, etc. are of paramount importance in transportation, industry and other areas of human endeavor. In carrying out such measurements, a sensing element of one kind or another is used to provide an electrical signal (such as voltage or current, for example) the magnitude of which varies in response to the particular quantity being measured. Thus, thermocouples, which are thermo-electric transducers, are widely used to measure temperature and produce an output voltage which is proportional to temperature. This voltage is then suitably processed and displayed to give a direct indication in terms of the variable being measured, i.e. in degrees. Many of these sensors, however, are non-linear in character in that the sensor parameter which varies with the quantity measured varies non-linearly over the range of interest. Thus, for example, if the output voltage of a thermocouple is plotted against temperature, the plot shows a curve which is not a straight line over the temperature range of interest. This, of course, introduces many difficulties in accurately displaying and indicating the quantity being measured. Non-linear scales, compensating networks, and various other arrangements have been utilized to try to overcome the difficulties introduced by the non-linear temperature/voltage relationship of the thermocouple.

This problem of measuring and displaying becomes even more complex when the measured quantity is to be displayed in digital form. That is, the sensor parameter which varies with the quantity being measured must be processed to convert the sensor output which is usually an analog signal such as voltage, to digital form which is then utilized to actuate a digital display. Because of the non-linear relationship between sensor output and the quantity being measured, which non-linearity is carried over to the digital form of the sensor output, the digital display, which usually depends on a pulse count, cannot be directly calibrated in terms of the measured quantity. As a result, some form of conversion table from the digital readout to temperature must be utilized to determine what the temperature measured by the termocouple actually is. Consequently, in order to have a direct digital readout of the quantity being measured, signal processing means for linearizing the digital signal must be provided.

SUMMARY OF THE INVENTION

It is therefore, a general object of the invention to provide an electronic digital signal linearizer.

It is a more specific object of the present invention to provide a signal conversion apparatus which provides an output pulse rate which is linear with respect to the quantity being measured.

Briefly stated, in accordance with the present invention, there is provided a digital signal linearizer in which a pulse train proportional to the non-linear output of the sensor is applied to a programmable "divide-by-N" frequency divider. The output of the divider is coupled to counter which provides an output to a readout means. The output of the counter is also coupled to programming control logic which is preset to set a particular divisor in the programmable frequency divider for each discrete segment of the range of interest of the quantity being measured so that the output from the counter is linear with respect to the quantity being measured.

BRIEF DESCRIPTION OF THE DRAWINGS

The subject matter of the invention is pointed out with particularity in the claims forming the concluding portion of the specification. The invention, both as to its organization and manner of operation may be best understood by reference to the following drawings taken in connection with the following description.

DESCRIPTION OF THE PREFERRED EMBODIMENT

Figure 1:
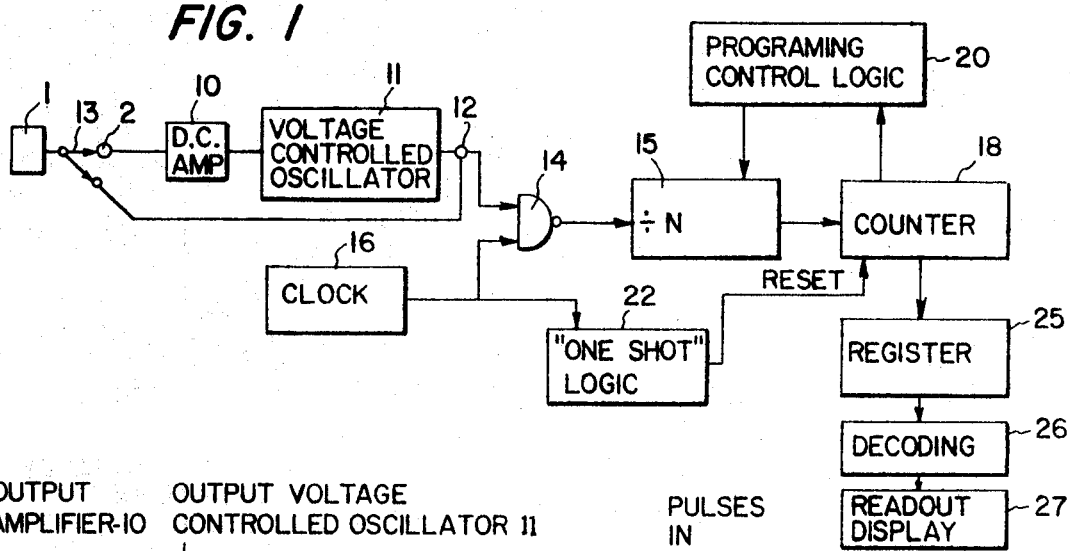
FIG. 1 is a circuit diagram of a digital signal linearizer constructed in accordance with the present invention.

FIG. 1 is a circuit diagram of a digital signal linearizer constructed in accordance with the present invention. A non-linear condition-responsive source 1, which may be a temperature responsive transducer such as a thermocouple, provides a direct current output voltage indicative of the value of a quantity being measured, i.e. temperature. The output voltage from source 1 is coupled over input terminal 2 to a direct current amplifier 10 which provides an amplified input to a voltage controlled oscillator 11. Voltage controlled oscillator 11 produces an output pulse train at terminal 12 which has a pulse rate proportional to the input voltage from source 1. In the event the transducer is of the type which provides a digital output, the transducer may be directly connected to terminal 12 by a switch 13, as indicated by the dotted line in FIG. 1 and amplifier 10 and oscillator 11 eliminated. Thus, a digital output is provided at terminal 12 which is indicative of the output of the condition-responsive device.

Figure 2:
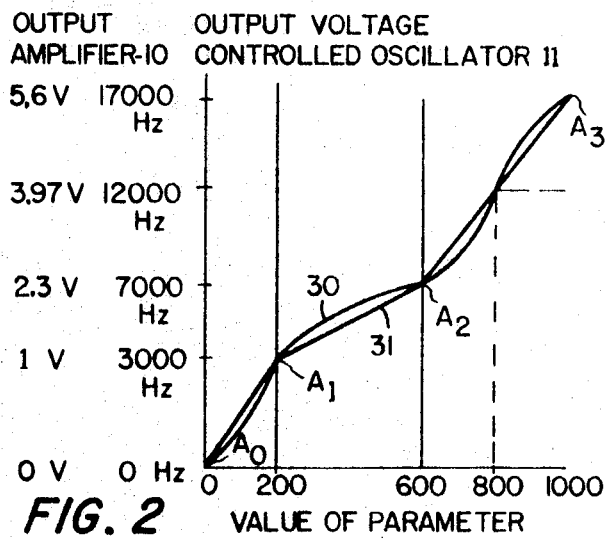
FIG. 2 is a plot of output voltage of a transducer versus the value of a parameter being measured.

The output pulses from the oscillator are applied to a circuit means for controllably dividing the pulses by varying factors so that the resulting output pulses have a fixed pulse per degree relationship thereby linearizing the signal. To this end, the temperature range of interest is broken into a number of segments with the temperature/voltage relationship over each segment being generally linear but having different slopes. The divisor $n$ of the dividing circuit means is varied so that the ratio of the divisors $n$ over any two segments is proportional to the ratio of the slope of temperature/voltage curve over the same segments. Thus, if the slope of one segment is twice the slope of another segment, the divisor over the one segment is made one-half the value of the divisor over the other segment. As a result the output is linearized over all the segments and the output pulses have a fixed pulse per degree relationship over the entire temperature range of interest. In other words, the temperature range is broken up into a plurality of segments each of which is characterized by a linear pulse/degree or pulse/unit coupled to programming control logic circuit 20. As decade counter 18 passes through selected, predetermined counts, each corresponding to a breakpoint which, as will be explained presently in connection with FIG. 2, represents temperature segment having a pulse temperature slope which differs from that of the preceding segment, the output voltage levels from counter 18 change and, in turn control operation of logic circuit 20. Programming control logic circuit 20 is a logic circuit capable of assuming different digital states, i.e. producing a binary state 1110, 1100, etc. in response to the output voltage from counter 18 as the count in decade counter 18 passes through the predetermined counts. Each of the voltage levels representing these binary states when coupled to programmable "divide-by-N" frequency divider 15 establish a different divisor $n$. At the end of each gating period, a reset signal is applied to the decade counter 18 from a conventional delayed "one shot" logic circuit 22 which has its input coupled to the clock oscillator 16. In order to provide information for display, a second output from the decade counter 18 is provided to an output frequency utilization means including a register 25. The output of the register 25 is coupled to a decoding circuit 26 which provides an input to a readout display means 27.

THEORY OF OPERATION

FIG. 2 illustrates the relationship between the output voltage and the quantity being measured by a typical transducer such as a thermocouple. The abscissa is labeled in arbitrary units indicative of the value of a quantity being measured which in the case of a thermocouple is obviously degrees, either fahrenheit or centigrade, while the ordinate is plotted both in volts output from direct current amplifier 10 and output of voltage controlled oscillator 11. The fine-line curve 30 is representative of the actual output curve of the transducer, and the heavier curve 31 is a linear approximation of the actual response curve. The linear approximation may be made in as many segments as is desired to produce an approximation which is accurate within desired tolerances. For ease of illustration, the curve is divided into three segments. Each segment is represented by a straight line from a first break point to a next break point i.e. the voltage/unit relationship is linear over the segment. The four break points of the curve in FIG. 2 are denoted $A_0$–$A_3$. Each segment of the temperature range of interest, it will be noted, has a different slope.

Figure 3:
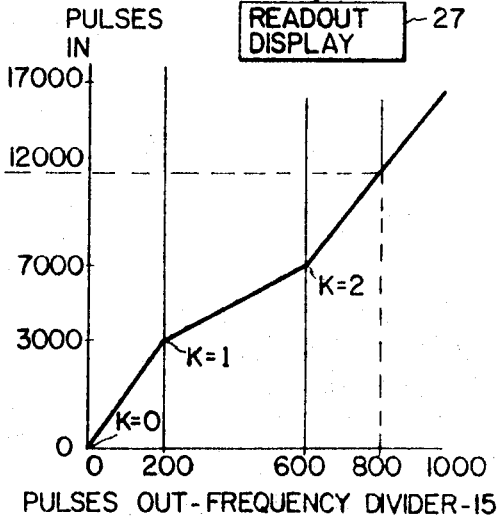
FIG. 3 is a diagram of a frequency divider input output characteristics selected for use with the transducer having the response curve illustrated in FIG. 2.

The control logic, i.e. the programmable "divide-by-N" frequency divider 15, decade counter 18, and programming control logic 20 selects the factor of division $n$ of the gated output of the voltage controlled oscillator 11 for each segment so that the output of decade counter 18 is linear. The manner in which this is achieved can be seen most readily in connection with FIGS. 3 and 4. In FIG. 3, the abscissa shows the pulse count output of the decade counter 18 during one gating period and the ordinate represents pulse counts from the voltage controlled oscillator 11 with variable divisors utilized to provide a linear output.

Figure 4:
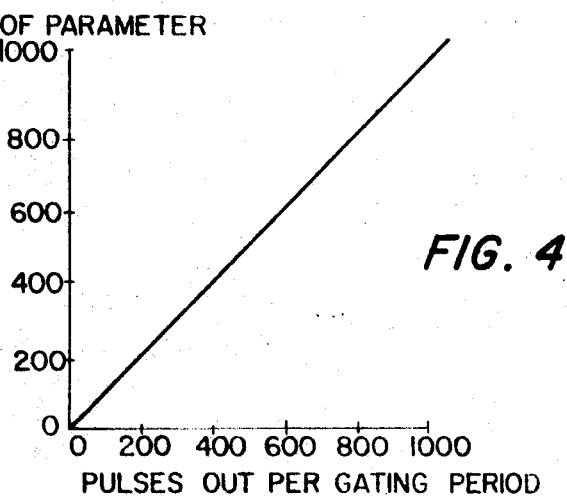
FIG. 4 is a plot of the output of the digital signal linearizer versus the parameter.

By providing the above-described relationship, the result illustrated in FIG. 4 is obtained in which the abscissa is pulse counts provided during a gating period and the ordinate is the value of the parameter measured. The system may be normalized such that the number illustrated on the readout display means will correspond to the value of the parameter measured. In order to provide the desired results, the system is arranged to operate according to the following equations:

use with the instant invention is described and claimed in an application Ser. No. 852. 042 entitled "Voltage Controlled Oscillator" filed Aug. 21, 1969 in the name of Douglas M. Bauer and assigned to assignee of the present invention. The first readout occurs after clock oscillator 16 opens gate 14 for a fixed period, a pulse train having a repetition rate of 12 KHz is applied to programmable "divide-by-N" frequency divider 15.

For the first segment, (i.e. from 0–200) frequency divider 15 is programmed to transfer one pulse out for every 15 pulses in, i.e. the divisor is is set so that $n=15$. This continues until the count along the curve reaches the break point $A_1$ where the slope of curve 31 changes., i.e. after 3000 pulses in and 200 pulse counts out over the next segment from 200–600, the pulse rate varies from 3000 to 7000 Hz, or a slope of 10 pulses per unit. The output voltage level from counter 18, now actuates programming control logic 20 which produces a digital signal in response to that count, which when applied to frequency divider 15 changes the divisor of divider 15 to correspond to the slope of the segment between the break points $A_1$ and $A_2$. The new divisor for the exemplary curve 31 is 10 so that the frequency divider now produces one pulse out for every 10 input pulses. The count continues until programming control logic detects voltage level from counter 18 representing a count of 600 which occurs at point $A_2$. At the break point $A_2$ the programming control logic 20 provides another digital control signal to frequency divider 15 to change its divisor. In the third segment of the curve shown in FIG. 2, the slope of the curve is 25 pulses per unit and the divisor is changed to a value of 25 so that one output pulse is provided for 25 input pulses.

The gating period of the clock oscillator 16 is chosen such that the maximum frequency output of the voltage control oscillator 11 gives a full scale reading. Since a programming control logic circuit 20 and a frequency divider 15 may be utilized which have switching times on the order of nanoseconds, no error is introduced by failure to of circuit elements to respond to input pulses.

The information in the decade counter 18 is transferred to the register 25, conventional decoding circuitry 26 and the

| Segment Number | Range | |
|---|---|---|
| 1 | $A_0 < C < A_1$ | $C = \dfrac{fT}{N_1}$ |
| 2 | $A_1 < C < A_2$ | $C = f\left(T' - \dfrac{(A_1 - A_0)N_1}{f}\right)\bigg/N_2 + A_1$ |
| 3 | $A_2 < C < A_3$ | $C = f\left(T - \dfrac{(A_1 - A_0)N_1 - (A_2 - A_1)N_2}{f}\right)\bigg/N_3 + A_2$ |
| 4 | $A_{K-1} < C < A_K$ | $C = f\left(T - \dfrac{(A_1 - A_0)N_1 - \ldots - (A_{K-1} - A_{K-2})N_{K-1}}{f}\right)\bigg/N_K + A_{K-1}$ | f = frequency from voltage controlled oscillator 11.
C = total count during one gating period.
$A_0, A_1, A_2, A_3$ = break points of the segments.
T = constant time period controlled by the clock oscillator 16.
$N_K$ = frequency divider 15 divisor.
k = segment number.

OPERATION OF THE CIRCUIT

Let is be assumed that source 1 includes a transducer such as a thermocouple having the characteristics illustrated by curve 30 of FIG. 2. A linear approximation, such as curve 31 of FIG. 2 of this curve is then made. Let it further be assumed that the quantity being measured has a value of 800 (i.e., the temperature of a stream of exhaust gases being measured is 800° C, for example) and that for a value of 800 DC amplifier 10 provides an output of 3.98 volts. Voltage controlled oscillator 11, whose output is linear with respect to its input, provides an output of 12 KHz. One oscillator which is suitable for readout display means 27. The counter 18 is reset by the "one shot" logic circuit 22 to prepare for the next gating period. The "one shot" is triggered when the gating signal from the clock oscillator 16 closes the gate 14. Thus, the counter is set to zero to provide a new count during the next gating period.

It will be obvious that in the exemplary illustration of the operation of the system, an arrangement was described in which the divisors were adjusted so that the linearized output resulted in a slope of 1. It will be obvious, however, that this is illustrative only and that the system is capable of linearizing a non-linear input signal and producing any desired constant slope for the output signal.

The circuit can be used in any application which is necessary to provide a display indicative of a quantity measured by a condition-responsive sensor which has an output that has a non-linear relationship to the quantity being measured. The specification has incorporated a discussion of the theory of the present invention along with an analysis of its construction to enable those skilled in the art to make many forms of a digital signal linearizer constructed in accordance with the present invention.

What is claimed as new and desired to be secured by Letters Patent of the United States is:

1. A digital signal linearizer comprised of
   a. Input means to a sensor and for providing a digital representation in the form of output pulses the repetition rate of which varies with the quantity being measured by the sensor and with the said variations being non linear;
   b. A programmable frequency divider;
   c. Means for coupling the output of said input means to said programmable frequency divider;
   d. Counting means coupled to the output frequency divider and having an output for coupling to the output frequency utilization means whereby the registered count in said counting means represents the quantity being measured; and,
   e. Means for varying the division factor of said divider for different individual segments of the range of value of the quantity being measured, including means for actuating the change in division factor after a series of individual pre-determined counts with each of said individual counts representing the individual selected segments of said range, the division factor for each segment being such that the output of said counter per unit of the quantity being measured is constant over the entire range of value whereby the output applied to any utilization means varies linearly with the quantity being measured.

2. The digital linearizer according to claim 1 wherein the means for varying the division factor includes;
   a programming control logic coupled to said counting means and providing an output coupled to said frequency divider for setting the divisor or said programmable frequency divider in response to predetermined counts in said counting means, said programming control logic being presettable to produce output control signals in response to each of the predetermined counts, said control signals varying with different predetermined counts for establishing different divisors whereby said counter provides a linear output with respect to the quantity being measured.

3. A digital signal linearizer according to claim 2 in which said input means comprises a voltage controlled oscillator.

4. A digital signal linearizer according to claim 3 in which said coupling means comprises means for gating the output of said voltage controlled oscillator into said programmable frequency divider for a fixed period of time and further comprising means for periodically resetting said counting means after the end of each fixed period of time.

5. A digital signal linearizer according to claim 4 in which said coupling means comprises a NAND gate having a first input connected to the output of said voltage controlled oscillator, a second input for connection to a clock oscillator, and an output connected to said programmable frequency divider, and in which said means for resetting comprises a logic circuit having an input for connection to the clock oscillator and an output connected for resetting said counting means.

6. A digital signal linearizer according to claim 5 further comprising register means coupled to the output of said counting means, means for periodically resetting said register means after each period of time, and decoding means connected to the output of said register means, and readout display means coupled to the output of said decoding means.

7. The digital signal linearizers according to claim 1 in which said input means comprises a voltage controlled oscillator for producing a train of pulses having a repetition rate proportional to the quantity being measured and gating for coupling the pulses into said programmable divider for a fixed time period, and means for resetting the counting means at the end of each fixed time period.

* * * * *